(12) United States Patent
Hawkins et al.

(10) Patent No.: US 8,551,380 B2
(45) Date of Patent: Oct. 8, 2013

(54) METHOD OF LAYING UP PREPREG PLIES ON CONTOURED TOOLS USING A DEFORMABLE CARRIER FILM

(75) Inventors: Robert D. Hawkins, Bonney Lake, WA (US); Kurtis S. Willden, Kent, WA (US); Andrew E. Modin, Enumclaw, WA (US); Edoardo Depase, Manhattan Beach, CA (US); Michael L. Glain, Settle, WA (US); Benjamin Adam Mussi, Bellevue, WA (US); Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/945,024

(22) Filed: Nov. 12, 2010

(65) Prior Publication Data

US 2012/0121866 A1    May 17, 2012

(51) Int. Cl.
*B29C 55/04* (2006.01)
*B29C 55/10* (2006.01)

(52) U.S. Cl.
USPC ........... 264/257; 264/313; 264/295; 264/296; 264/258

(58) Field of Classification Search
None
See application file for complete search history.

(56) References Cited

U.S. PATENT DOCUMENTS

| 3,983,282 A | 9/1976 | Seemann |
|---|---|---|
| 4,016,022 A | 4/1977 | Browning |
| 4,120,632 A | 10/1978 | Stoebrel |
| 4,132,755 A | 1/1979 | Johnson |
| 4,180,608 A * | 12/1979 | Del ................................ 428/196 |
| 4,622,091 A | 11/1986 | Letterman |
| 4,726,924 A | 2/1988 | Mittelstadt |
| 4,902,215 A | 2/1990 | Seemann |
| 4,942,013 A | 7/1990 | Palmer |
| 5,052,906 A | 10/1991 | Seemann |
| 5,116,216 A | 5/1992 | Cochran |
| 5,123,985 A | 6/1992 | Evans |
| 5,129,813 A | 7/1992 | Shepherd |
| 5,316,462 A | 5/1994 | Seemann |
| 5,364,584 A | 11/1994 | Imanara |
| 5,427,725 A | 6/1995 | White |
| 5,439,635 A | 8/1995 | Seemann |
| 5,441,692 A | 8/1995 | Taricco |
| 5,576,030 A | 11/1996 | Hooper |
| 5,601,852 A | 2/1997 | Seemann |
| 5,702,663 A | 12/1997 | Seemann |
| 5,721,034 A | 2/1998 | Seemann |

(Continued)

FOREIGN PATENT DOCUMENTS

| EP | 0271263 A2 | 6/1988 |
|---|---|---|
| EP | 0348831 A2 | 1/1990 |

(Continued)

OTHER PUBLICATIONS

Brittles, "New Developments in Resin Transfer Moulding," Proc. 19th International Composites Congress. Nov. 1994, pp. 11-26.

(Continued)

*Primary Examiner* — Edmund H. Lee
(74) *Attorney, Agent, or Firm* — Yee & Associates, P.C.

(57) ABSTRACT

Composite prepreg is laid up over a tool by placing prepreg material on a carrier film and using the carrier film to apply the prepreg material to the tool. The prepreg is conformed to contours of the tool by deforming the carrier film.

24 Claims, 8 Drawing Sheets

(56) References Cited

U.S. PATENT DOCUMENTS

| | | | |
|---|---|---|---|
| 5,904,972 A | 5/1999 | Tunis | |
| 5,939,013 A | 8/1999 | Han | |
| 5,958,325 A | 9/1999 | Seemann | |
| 6,090,335 A | 7/2000 | McClure | |
| 6,299,819 B1 | 10/2001 | Han | |
| 6,391,436 B1 | 5/2002 | Xu | |
| 6,406,659 B1 | 6/2002 | Lang | |
| 7,186,361 B2 * | 3/2007 | Kasai et al. | 264/137 |
| 7,469,735 B2 | 12/2008 | Brown | |
| 7,544,261 B1 * | 6/2009 | Nogueroles Vines et al. | 156/202 |
| 7,603,017 B2 | 10/2009 | Cianciotto et al. | |
| 7,670,525 B2 | 3/2010 | Weidmann et al. | |
| 7,871,553 B2 | 1/2011 | Wilkerson et al. | |
| 7,975,549 B2 | 7/2011 | Fetzer et al. | |
| 7,993,480 B2 | 8/2011 | Anderson et al. | |
| 8,066,929 B2 | 11/2011 | Eberth et al. | |
| 2006/0059848 A1 | 3/2006 | MacDonald-Schmidt et al. | |
| 2006/0216480 A1 * | 9/2006 | Weidmann et al. | 428/174 |
| 2006/0249868 A1 | 11/2006 | Brown | |
| 2007/0161483 A1 * | 7/2007 | Raf | 493/296 |
| 2007/0175575 A1 | 8/2007 | Rubin et al. | |
| 2008/0053599 A1 * | 3/2008 | Aijima | 156/196 |
| 2009/0008825 A1 | 1/2009 | Eberth et al. | |
| 2009/0148647 A1 | 6/2009 | Jones et al. | |
| 2009/0239018 A1 * | 9/2009 | Aijima | 428/40.1 |
| 2009/0261199 A1 | 10/2009 | McCarville | |
| 2009/0263618 A1 | 10/2009 | McCarville | |
| 2010/0080942 A1 | 4/2010 | McCarville et al. | |
| 2011/0097554 A1 | 4/2011 | Kehrl et al. | |
| 2011/0192541 A1 | 8/2011 | Anderson et al. | |

FOREIGN PATENT DOCUMENTS

| | | | |
|---|---|---|---|
| EP | 0816438 A2 | | 1/1998 |
| EP | 1038656 A1 | | 9/2000 |
| GB | 2467417 | * | 8/2010 |
| JP | 61202823 | * | 9/1986 |
| WO | WO2009112694 A2 | | 9/2009 |

OTHER PUBLICATIONS

Sieberg et al., "Eine fortschrittliche GFK—Fertigungstechnik setze sich durch: Praxiserfahrungen mit dem Vakuum-Injektions-Verfahren," Studiedag Vakuuminjecteren, XP002169062, Oct. 27, 1998, pp. 13-19. (German-language article not available in English).

Williams et al., "Resin Infusion under Flexible Tooling (RIFT): A Review," Composites Part A: Applied Science and Manufacturing, vol. 27, No. 7, 1996, pp. 517-524.

Buckingham et al., "Automating the Manufacture of Composite Broadgoods," Composites, IPC Business Press Ltd., Haywards Heath, GB, vol. 27A, No. 3, Mar. 1996, pp. 191-200.

EP search report dated Aug. 17, 2012 regarding application 11187925.0-2307/2452806, reference NAM/P119086EP00, applicant The Boeing Company, 11 pages.

Hohfeld et al., "Consolidation of thick, close, circular knitted glass fiber textiles with epoxy resin into flat panels, tubes, and T-profiles," 3rd International Conference of Flow Processes in Composite Materials, Jul. 1994, pp. 120-142.

Kehrl et al., "Curved Composite Frames and method of Making the Same," U.S. Appl. No. 13/684,988, filed Nov. 26, 2012, 64 pages.

Smith Jr., et al., "Method of Fabricating a Curved Composite Structure Using Composite Prepreg Tape," U.S. Appl. No. 13/736,021, filed Jan. 7, 2013, 42 pages.

Guzman et al., "Method and Apparatus for Producing Contoured Composite Structures and Structures Produced Thereby," U.S. Appl. No. 13/013,097, filed Jan. 25, 2011, 94 pages.

* cited by examiner

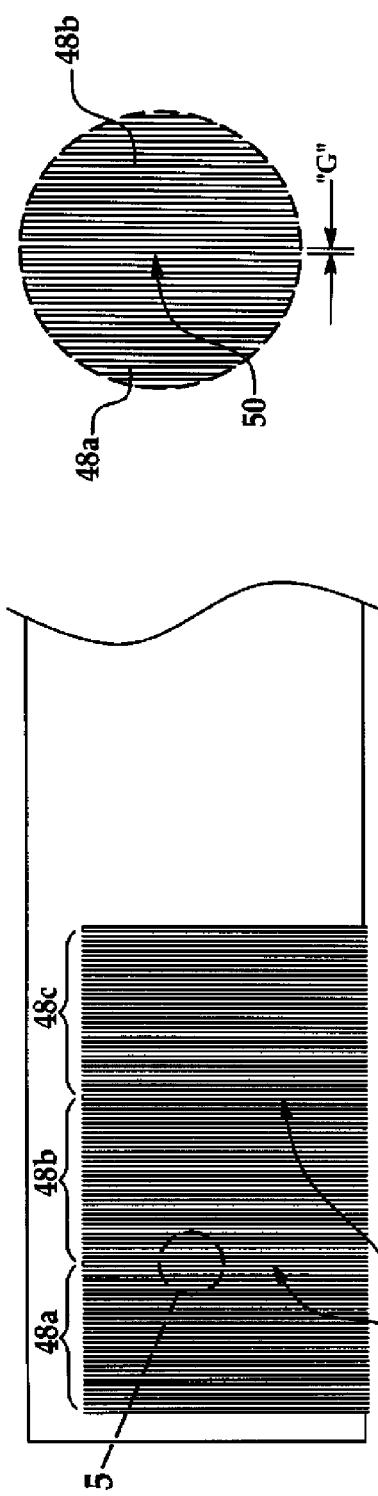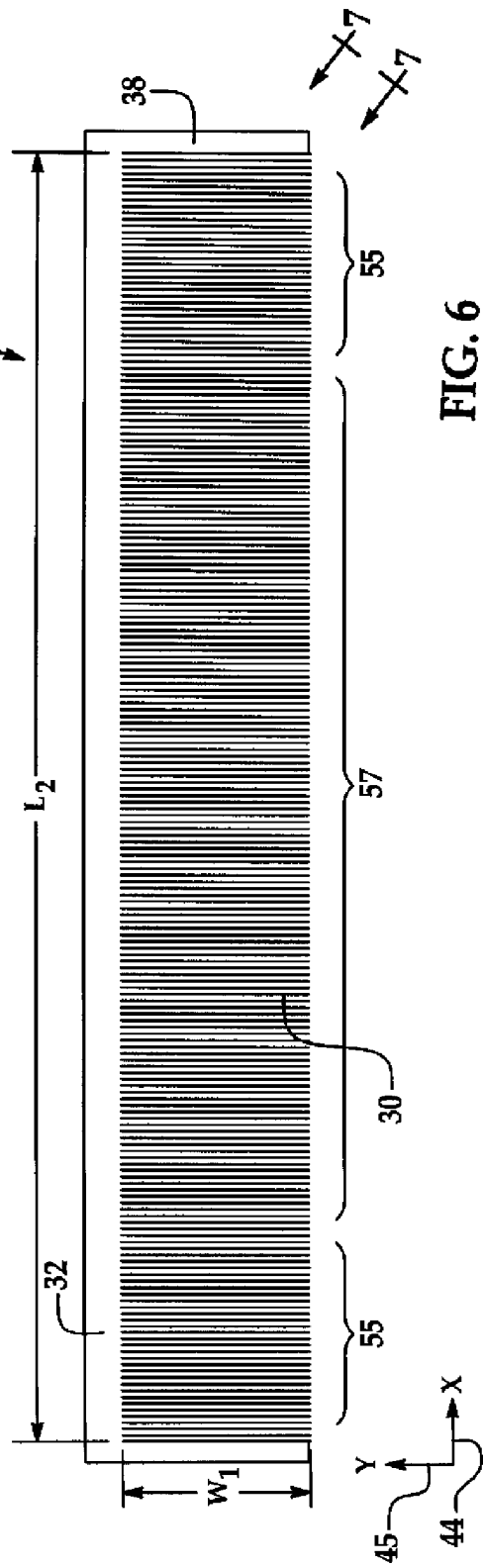

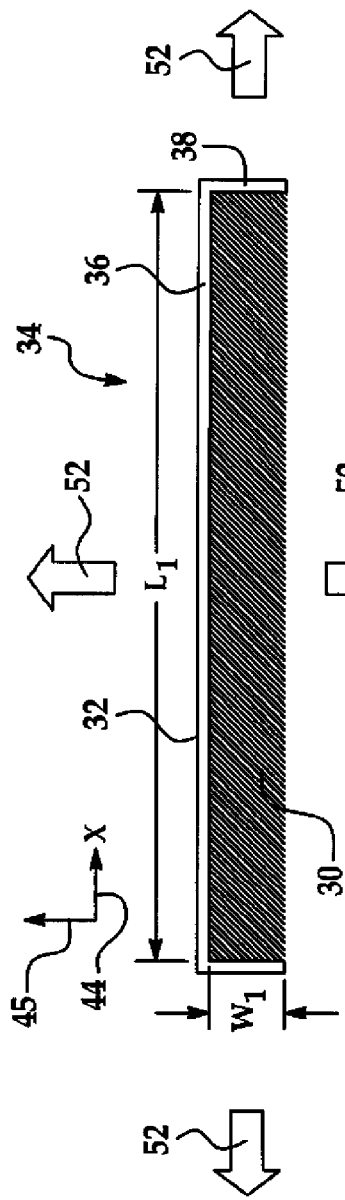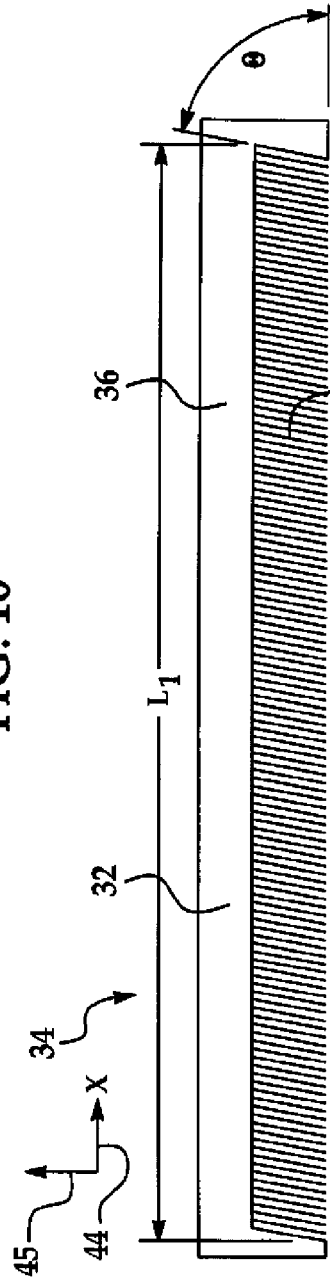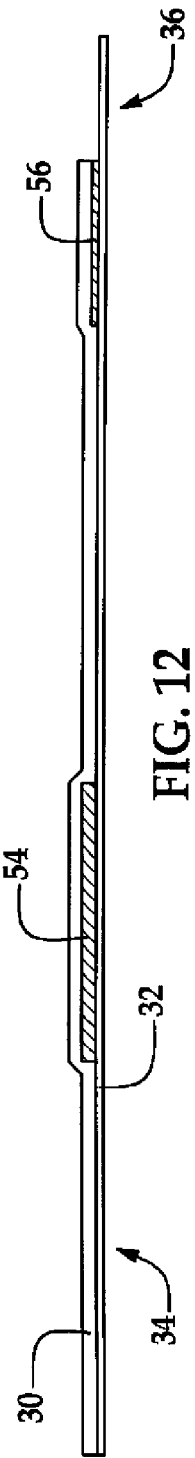
FIG. 10
FIG. 11
FIG. 12

METHOD OF LAYING UP PREPREG PLIES ON CONTOURED TOOLS USING A DEFORMABLE CARRIER FILM

TECHNICAL FIELD

This disclosure generally relates to processes for fabricating composite structures, and deals more particularly with a method of handling and laying up composite plies, especially on contoured tools.

BACKGROUND

During layup of prepreg plies over a tool, it is sometimes necessary to closely conform the ply to curves, contours and/or features of the tool in order to assure that the layup is substantially free of voids, wrinkling and/or buckling. Known techniques for conforming plies to curved tool surfaces involve darting, cutting and/or splitting the ply during the layup process, and/or extensive hand sweeping to conform the ply to contoured tool surfaces. These techniques may be time consuming and/or may provide undesirable mechanical strength of the cured part. Another solution to the problem involves using relatively narrow slit prepreg tape in order to more closely conform the composite material to contoured tool surfaces. However the use of slit tape may increase material costs and reduce production rate since laying down slit tape may be more time consuming.

Accordingly, there is a need for a method of laying up a composite ply over a contoured tool that allows the ply to be deformed as it is applied to the tool in order to more closely conform the ply to tool contours while the ply remains accurately positioned. There is also a need for a method of handling and transporting ply material which allows the material to remain stable during transport and layup.

SUMMARY

The disclosed embodiments provide a method of supporting, positioning and deforming a prepreg ply while it is being conformed to simple or complex shapes, contours and features of a tool. The method utilizes a deformable carrier film to support the ply during the layup process in order to prevent the ply from wrinkling and/or buckling as it is being laid up. Use of the carrier film allows the prepreg ply to be accurately positioned and uniformly deformed as needed to conform to contoured tool surfaces. The carrier film may also be used to stabilize the composite ply during handling and transporting. The method may eliminate the need for the use of slit tape, as well as extensive hand working, darting, cutting, and splitting during ply layup. The method may also increase laydown rates of composite material and may facilitate automation of the layup process. Further, the method may improve the accuracy of ply boundaries and provide more uniform deforming of ply material when required, resulting in improvements in both the strength and appearance of cured composite parts.

According to one embodiment, a method is provided of laying up a composite part on a tool. The method comprises applying a composite prepreg over a deformable carrier and deforming the prepreg by deforming the carrier. The carrier is used to apply the prepreg to the tool. The method further includes removing the carrier from the deformed prepreg. Applying the prepreg includes compacting a prepreg ply face-to-face against the carrier. The carrier is removed from the deformed prepreg after the prepreg has been applied to the tool. Applying the prepreg includes applying courses of unidirectional prepreg tape in side-by-side relationship on the carrier. The method may further comprise applying at least one of a release film and a ply doubler on the carrier before the prepreg is applied to the carrier, and using the carrier to apply the at least one of the release film and the doubler to the tool. The method may also include reinforcing at least a portion of the carrier against deforming. Deforming the carrier is performed as the prepreg is being applied to the tool.

According to another embodiment, a method is provided of changing the grade of unidirectional prepreg fibers. The method comprises adhering the unidirectional prepreg fibers to a deformable carrier film, and increasing the spacing between the prepreg fibers by deforming the film in a direction transverse to the direction of the fibers.

According to still another embodiment, a method is provided of laying up composite prepreg over a contoured tool. The method comprises placing prepreg material on a carrier film; and using the carrier film to apply the prepreg material to the tool. Using the carrier film to apply the prepreg material includes deforming the prepreg material by deforming the film as the prepreg material is being applied to the tool. Placing the prepreg material on the carrier film includes laying down courses of unidirectional prepreg fiber tape in side-by-side relationship on the carrier film, and compacting the courses against the carrier film. The method further comprises removing the carrier film from the prepreg material after the prepreg material has been applied to the tool. Adhering the prepreg material to the carrier film includes compacting the prepreg material against the carrier film. The carrier film is deformed to conform the prepreg material to contours on the tool. The method may further comprise reinforcing at least a portion of the carrier film against deforming. The steps of placing prepreg material on a carrier film and using the carrier film to apply the prepreg material to the tool are repeated to form a multiply part layup.

BRIEF DESCRIPTION OF THE ILLUSTRATIONS

FIG. 4 is an illustration of a plan view of the carrier film showing several courses of composite material having been applied to the film.

FIG. 5 is an illustration of the area designated as '5' in FIG. 4.

FIG. 6 is an illustration similar to FIG. 1 but showing the carrier film and the ply having been deformed.

FIG. 10 is an illustration of a plan view of a carrier film having a 45 degree ply compacted thereon, prior to deforming.

FIG. 11 is an illustration similar to FIG. 10 but showing the carrier film and ply having been deformed in orthogonal directions.

FIG. 12 is an illustration of a sectional view of a carrier film having a ply, a ply doubler and a release film strip applied thereto.

DETAILED DESCRIPTION

Figure 1:
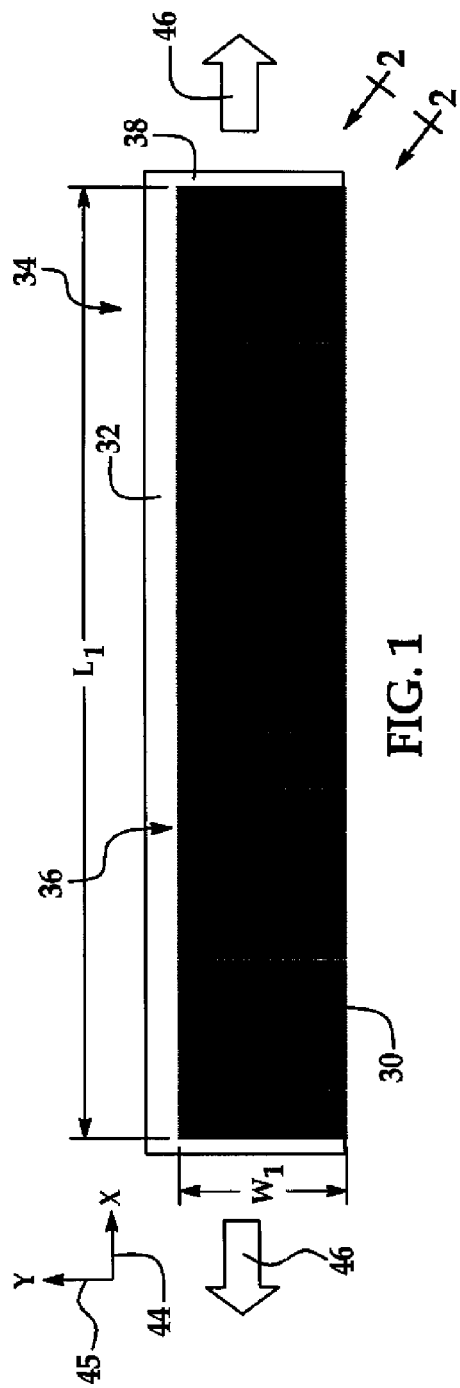
FIG. 1 is an illustration of a plan view of a composite prepreg ply held on a deformable carrier film, prior to deforming.
Figure 2:
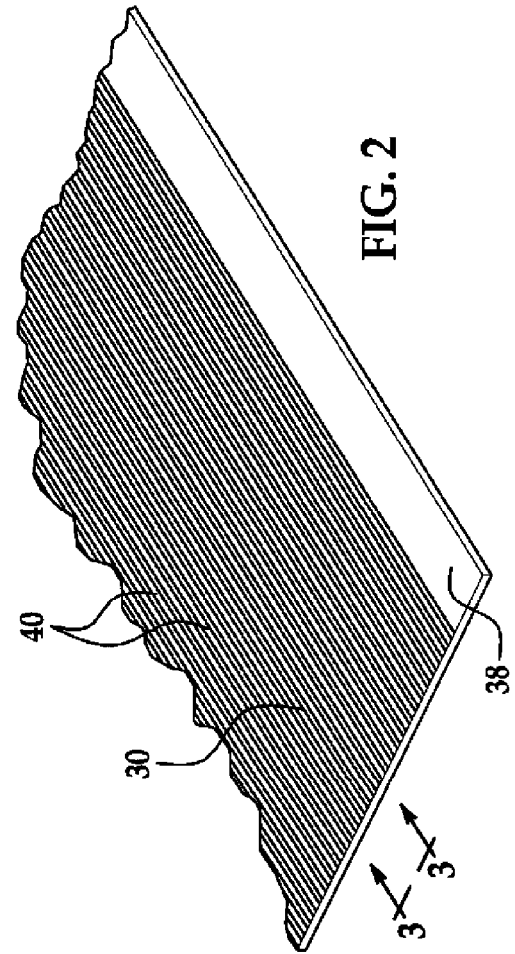
FIG. 2 is an illustration of a perspective view of a corner of the carrier film viewed from the direction shown as '2' in FIG. 1.
Figure 3:
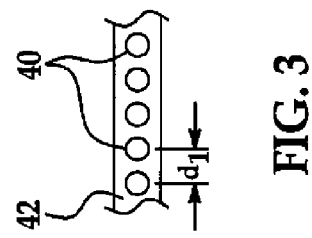
FIG. 3 is an illustration of a view of the ply in direction shown as '3' in FIG. 2.

Referring first to FIGS. 1, 2 and 3, a ply 30 of composite material is held in face-to-face contact on a carrier film 32 to form a carrier-ply assembly 34. The carrier film 32 may be used to transport the ply 30 and/or to apply the ply 30 to a tool (not shown) during a layup process for producing a composite part layup (not shown). In the example illustrated in FIGS. 1-3, the prepreg ply 30 includes unidirectional reinforcing fibers 40 having a 90 degree orientation, however other plies (not shown) in the part layup may have other fiber orientations based on a predefined ply schedule.

The fibers 40 are pre-impregnated with a suitable polymer resin 42 which acts as a matrix to hold the fibers in the desired orientation following curing. The composite ply 30 has a length $L_1$ and a width $W_1$ prior to being deformed during the layup process, as will be described in more detail below. The ply 30 is adhered to the carrier film 32 by the tackiness of the uncured resin 42 in the ply 30, however additional tackifiers may be used to provide the necessary adherence between the ply 30 and the carrier film 32. Following placement of the ply 30 on the carrier film 32, the ply 30 may be compacted against the carrier film 32 to assure that the ply is substantially free of buckling, wrinkles or other irregularities.

The ply 30 may be placed on the carrier film 32 so as to leave one or more edge margins 36, 38 on the film 32 around the ply 30 to facilitate handling of the film 32 and/or attachment of hardware or equipment (not shown) to the film 32 that may be used to deform, manipulate and/or hold the carrier film 32 during the layup process. As will be discussed below, once compacted on the carrier film 32, the ply-carrier film assembly 34 can be deformed to fit different contours and shapes of a tool (not shown). The carrier film 32 allows for controlled and uniform or non-uniform deforming of the resin 42, and may also be used only as a carrier for transporting the prepreg ply 30 from an offline layup station (not shown) to the layup tool (not shown). As used herein, "deform" and "deforming" refer to stretching and/or shearing of a ply material in one or more directions, including simple and compound curves, and within one or more planes.

The carrier film 32 may be deformed in at least one direction, which in the illustrated example, is along an X axis 44, transverse to the orientation of the fibers 40. The carrier film 32 may comprise, for example and without limitation, a latex rubber or similar natural or synthetic deformable material having a thickness suitable for the application. The carrier film 32 material may be an elastic material that returns substantially to its original size and shape following deforming. During the layup process, the ply 30 may be deformed by grasping the film at the opposite edge margins 38 and pulling film 32 in opposite directions indicated by the arrows 46, substantially along the X axis 44.

Prior to the ply 30 being deformed, the fibers 40 may having an inter-spacing $d_1$. The visco-elastic resin 40 (FIG. 3) yields when deformed in a direction perpendicular to the fiber direction (in this case, the Y axis 45), thereby allowing the fibers 40 to slip or shear substantially simultaneously in a direction parallel to the fiber direction, i.e. along the X axis 44, which permits the prepreg ply 30 to conform to the contours of a layup tool (not shown).

Referring to FIGS. 4 and 5, the ply 30 may be applied to the carrier film 32 by placing a plurality of individual courses 48a, 48b, 48c of unidirectional tape on the film 32, in side-by-side, substantially parallel and abutting relationship either by hand or by using automated fiber placement equipment (not shown). Depending on the application and the particular materials being used, the edges 50 of the courses may overlap slightly or may form gaps G between the courses 48. Deforming of the carrier film 32 may be used to control the size of the overlap or gap G between the courses 48 during layup of the ply 30 on a tool (not shown). Furthermore, the carrier film 32 may be used to change the grade of a prepreg material used to form the ply 30. For example, the grade of a prepreg material may be changed by uniformly deforming the material to a desired grade. Changing the grade of a prepreg material in this manner using the carrier film 32 may be useful in producing interleafed doublers that may reduce part weight, and/or material costs.

Figure 8:
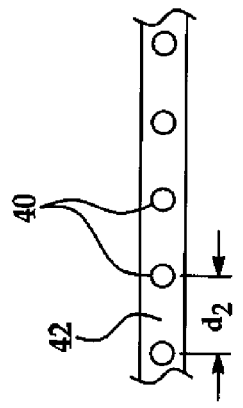
FIG. 8 is an illustration of a sectional view of the deformed ply viewed in the direction shown as '8' in FIG. 7.
Figure 7:
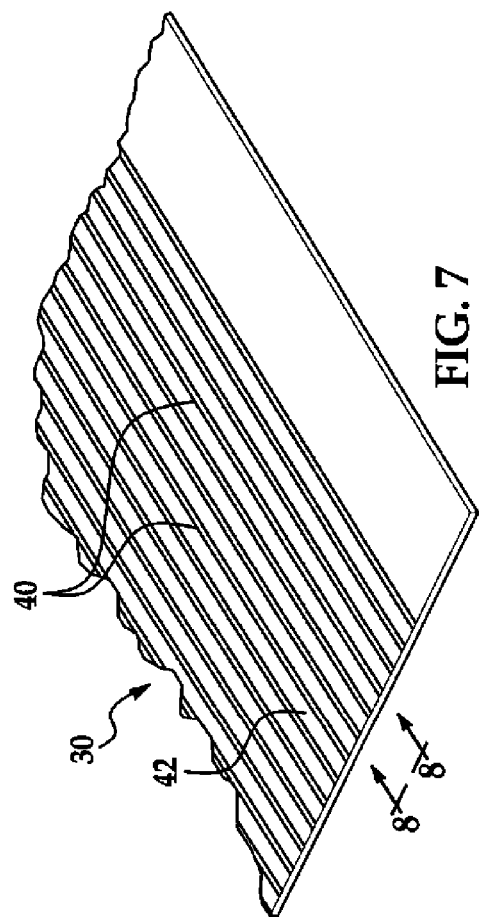
FIG. 7 is an illustration similar to FIG. 2 showing a corner of the ply and the carrier film after deforming.

FIGS. 6, 7 and 8 illustrate the ply 30 following deforming along the X axis 44 in the direction of the arrows 46 in FIG. 1. From FIG. 6 it can be seen that while the width $W_1$ of the ply 30 remains substantially the same, the ply 30 has been deformed to a greater length $L_2$ as a result of the deforming of the carrier film 32. Deforming of the carrier film 32 effectively deforms the 42 resin in the ply 30 which results in an increase in the spacing between the reinforcing fibers to a dimension $d_2$ which is greater than $d_1$. Deforming the ply 30 in this manner may allow the ply 30 to better conform to contours and other features of a tool surface (not shown) during the layup process, and may stabilize the ply material during layup. The carrier film 32 may prevent the prepreg ply 30 from splitting, wrinkling and/or buckling as it is being formed over a tool (not shown), and may allow the ply 30 to be precisely positioned on the tool during the layup process. It should be noted here that generally, when deforming a 90 degree ply 30 as described above in connection with FIGS. 1-8, the fibers 40 may be expected to deform substantially uniformly along the X axis 44. However, when deforming non-90 degree plies 30, the fiber deformation may not be uniform. For example, when deforming a 0 degree ply 30 (not shown) in the direction of the X axis 44, the fibers 40 near the ends 55 (FIG. 6) of the ply 30 may shear at an angle (not shown) relative to the fibers 40 near the center 57 of the ply 30 which retain their 0 degree orientation. This shearing effect may occur gradually, growing increasingly from the center 57 toward the ends 55. Compensation for this shearing deformation may be achieved by cutting the ends 55 of the ply 30 at a pre-selected angle (not shown). When deforming a 45 degree ply 30, both shearing and stretching of the fibers 40 may occur.

Figure 9:
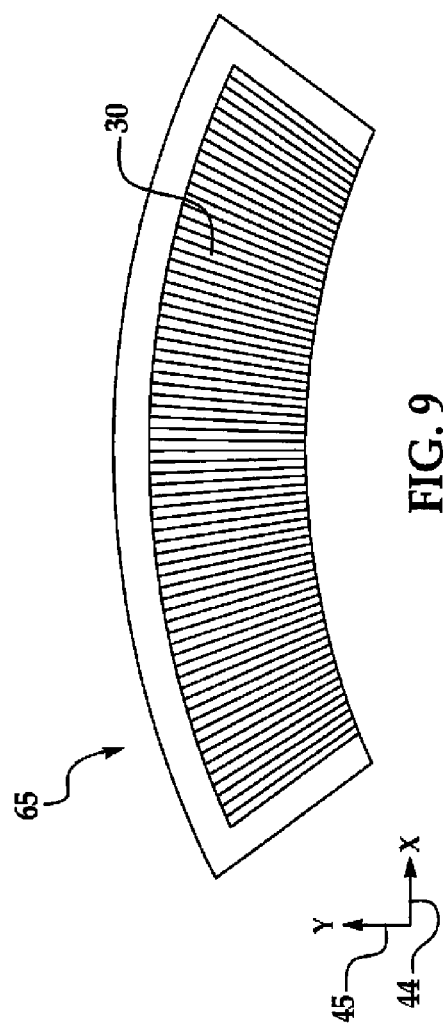
FIG. 9 is an illustration of a plan view of a 90 degree ply on a carrier film that has been deformed to stretch the ply into a fan shaped pattern.

FIG. 9 illustrates the use of the carrier film 32 to deform a 90 degree ply 30 into a radial or fan-like pattern 65 within a single plane, wherein the fiber directions are shown in solid lines. Although not shown in the Figure, this same radial pattern 65 may be deformed into other planes.

FIGS. 10 and 11 illustrate a prepreg ply 30 having a 45 degree fiber orientation which has a width $W_1$ and a length $L_1$ prior to deforming as shown in FIG. 9. In this example, the carrier film 32 is deformed along orthogonal X and Y axes 44, 45, causing the ply 30 to be likewise deformed to both a greater length L2. Stretching of the film 32 along the Y axis results in a change in the orientation angle of the fibers 40 to some angle θ less than 45 degrees. Although the ply examples shown in FIGS. 1-10 are shown being deformed along single axis or two orthogonal axes 44, 45, the ply 30 may be deformed in other directions and within other planes, depending on the requirements of the application and the geometry of the tool (not shown) to which the ply 30 must be conformed. Moreover, as will be discussed below, it may be possible to deform only one or more portions of the carrier film 32 so that only corresponding portions (not shown) of the ply 30 are deformed during layup process.

In some applications, it may be possible to use the carrier film 32 to pre-position and place additional items of a layup assembly on a tool (not shown), such as without limitation, doublers, release films, and caul plates, along with the ply 30. For example, FIG. 12 illustrates a ply 30 placed on a carrier film 32 in which a composite doubler 54 is sandwiched between the ply 30 and the carrier film 32. Similarly, a strip 56 of release film is sandwiched between the ply 30 and the carrier film 32 along the edge margin 36 on the film 32 which may aid in releasing and peeling the carrier film 32 away from the laid up ply 30. Thus, in this example, during the layup process, use of the carrier film 32 allows the ply 30, the doubler 54 and the release film strip 56 to be precisely positioned relative to each other, and to be laid up over a tool (not shown) in a single step.

Figure 13:
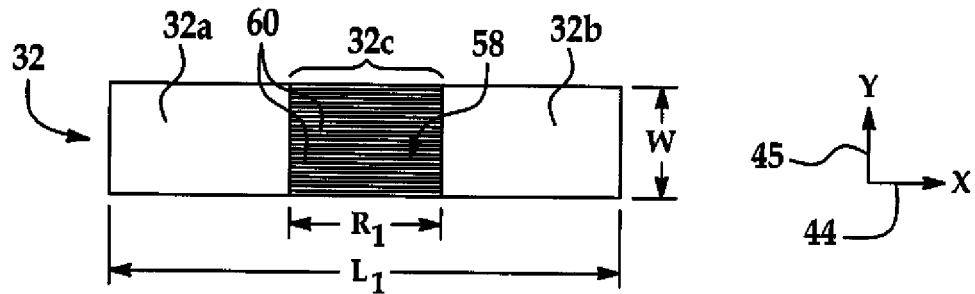
FIG. 13 is an illustration of a carrier film prior to deforming which includes a substantially non-deformable area containing a fiber reinforcement.

As previously mentioned, it may be possible or desirable in some applications to deform only a portion of the ply 30 during the layup process. Deforming of the carrier film 32 can be tailored to selectively constrain the elasticity of the ply carrier 32 using any of several techniques that suit part geometry and forming requirements. FIG. 13 illustrates a carrier film 32 having a section 32c that includes a reinforced portion 58 which resists deforming as the film 32 is being deformed during the layup process. In this example, the reinforcement of the film portion 32c is achieved by impregnating unidirectional fibers 60 into the carrier film 32, oriented in the direction that the film 32 is to be deformed, which in this example, is along the X axis 44.

Prior to deforming, carrier film has a length $L_1$ and the reinforced portion 32c has a width $R_1$ as shown in FIG. 13. When the carrier film 32 is deformed along the X axis 44, which corresponds to the axial direction of the fibers 60, the fibers 60 do not deform substantially, consequently the width $R_1$ of the reinforced section 32c remains the substantially same while the overall length of the carrier film 32 deforms to $L_2$ as a result of the non-reinforced sections 32a, 32b of the film 32 on each side of the reinforced section 32c being allowed to deform. It may also be possible to employ a reinforcement in the reinforced section 32c which allows some degree of deforming of the film 32, but less than other, non-reinforced areas of the film 32. The reinforced portion 32c may comprise, for example and without limitation, cross stitching (not shown) in the film 32. Depending on the type of reinforcement that is used, the width W of the reinforced portion 32c may or may not become more narrow when the film 32 is stretched.

Figure 14:
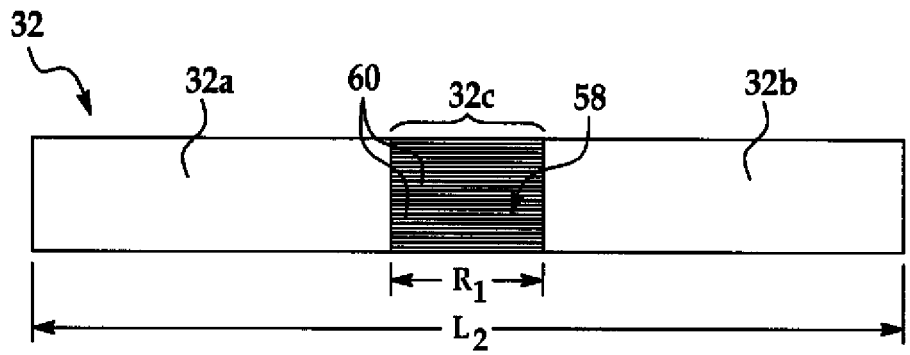
FIG. 14 is an illustration similar to FIG. 13 but showing portions of the carrier film having been deformed.
Figure 15:
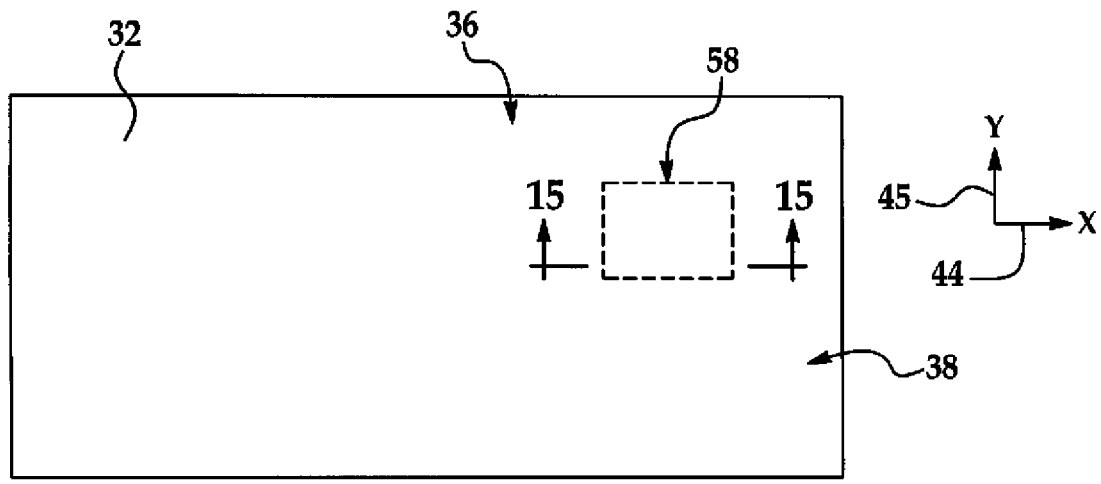
FIG. 15 is an illustration of a plan view of a carrier film having an isolated area of reinforcement therein.

In the case of the example shown in FIGS. 13 and 14, the reinforced area 58 is centrally located within the carrier film 32 and extends across its entire width W. FIG. 15 illustrates an example in which the reinforced area 58 is spaced inwardly from the edge margins 36, 38 of the carrier film 32 and is disposed off-center within the area of the film 32. As in the example shown in FIGS. 13 and 14, the reinforced area 58 shown in FIG. 15 also may incorporate reinforcing fibers 60 (see FIG. 14) into the carrier film 32 which may be unidirectional or multi-directional. For example, the fibers 60 may be woven together and incorporated into the film 32 in a manner that resists deforming in two orthogonal directions, e.g. along the X and Y axes 44, 45, that correspond to the orientations of the reinforcing fibers. Similarly, fibers 60 may be placed in additional orientations, e.g. 45 degree orientations, to resist deforming of the film 32 within the reinforced area 58 in other directions. While the reinforced area 58 is shown as being generally square in shape, a variety of other shapes are possible.

Figure 16:
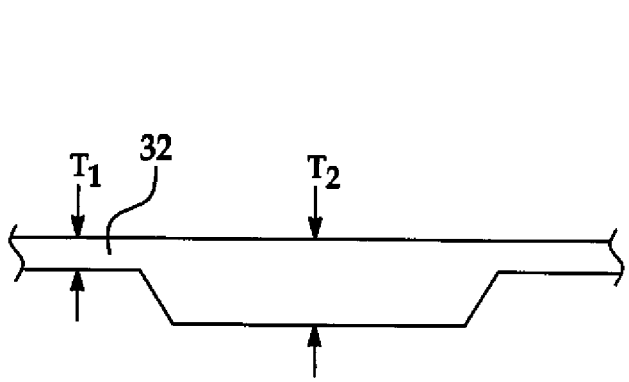
FIG. 16 is an illustration of a sectional view taken along the line 16-16 in FIG. 15.
Figure 17:
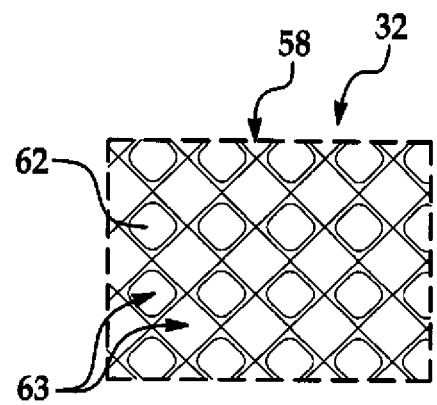
FIG. 17 is an illustration of a carrier film having an integrally formed embossment.

Other reinforcing techniques to prevent or reduce local deforming of the film 32 are possible. For example, as shown in FIG. 16, the substantially non-deformable, reinforced area 58 of FIGS. 13, 14 and 15 may be achieved by increasing the thickness $T_1$ of a carrier film to a thickness $T_2$ in the area 58 of reinforcement. FIG. 17 illustrates another technique for achieving the desired reinforcement, in which the carrier film 32 includes embossed dimples 62 in a desired pattern 63, in this case, diamonds that resist deforming in one or more directions. In some applications, it may be desirable to employ more than one of the above described techniques to achieve substantially non-deformable areas 58. For example, and without limitation, a combination of embossed dimples 62, increased film thickness $T_2$ and reinforcing fibers 58 may be used. It may also be possible to use one or more of the above reinforcement techniques to achieve differing degrees of film elongation in differing regions of the carrier film 32.

Figure 18:
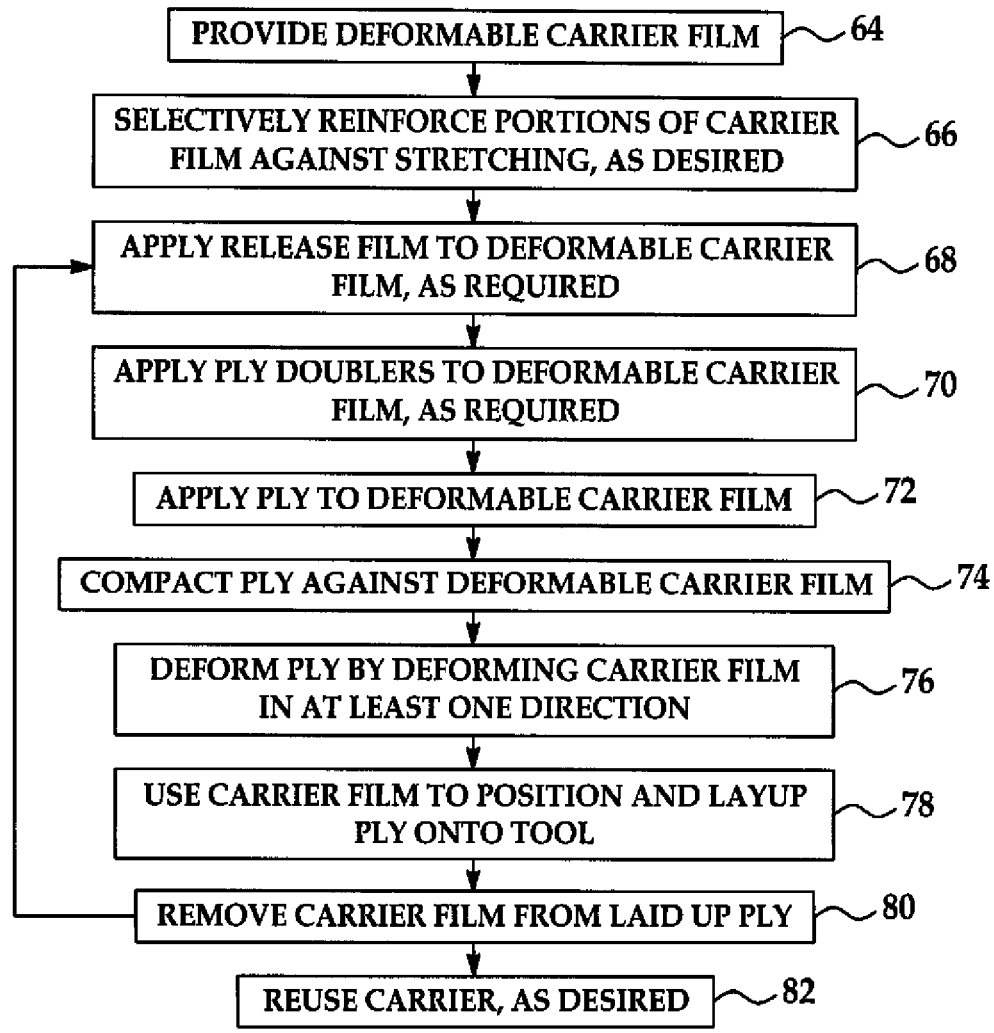
FIG. 18 is an illustration of a flow diagram of a method of laying up a composite structure using a deformable carrier film for ply layup.

Attention is now directed to FIG. 18 which broadly illustrates the steps of a method of laying up plies to form a composite part using the deformable carrier film 32 previously described. Beginning at 64, a deformable carrier film 32 is provided having a size and shape suitable for the application and the plies 30 to be laid up. At 66, portions of the deformable carrier film 32 may be reinforced, as desired. At 68, a release film 56 (FIG. 12) may be applied to the deformable carrier film 32, as required, to aid in the removal of the carrier film 32 from the ply 30 following layup. At 70, one or more ply doublers 54 (FIG. 11) or other materials may be applied to the deformable carrier 32, as desired.

At 72, a prepreg ply 30 is applied to the deformable carrier either manually, or using automated equipment to lay down courses 49 (FIG. 4) of prepreg material in side-by-side, possibly substantially abutting relationship on the carrier film 32. The ply 30 is laid up on the carrier film 32 in a reversed, mirror image-like fashion such that the left and right of the ply 30 are reversed. By reversing the ply 30 on the film 32, the ply 30 will have the proper orientation when transferred from the film 32 to a tool 90 (see FIG. 19). At 74, the ply material, including any doublers and/or release films are compacted against the deformable carrier film 32. This compaction may be performed mechanically with a hand sweep (not shown) or using a vacuum either with or without the application of heat. At 76, the carrier film 32 is deformed in at least one direction, thereby deforming the ply 30 to the desired shape and/or dimensions best suited for layup on the tool 90, including the shape and topography of the tool 90. At 78, with the ply 30 located on the film 32, and positioned between film 32 and the tool 90, the carrier film 32 is used to position and layup the ply 30 onto a tool 90 (see FIG. 19). At 80, following layup of the ply 30 onto the tool 90, the carrier film 32 is removed, as by peeling it away from the laid-up ply 30. At 82, the carrier film 32 may be reused, if desired, or discarded. Steps 68-80 may be repeated until all of the plies 30 of the part layup have been laid up.

Figure 19:
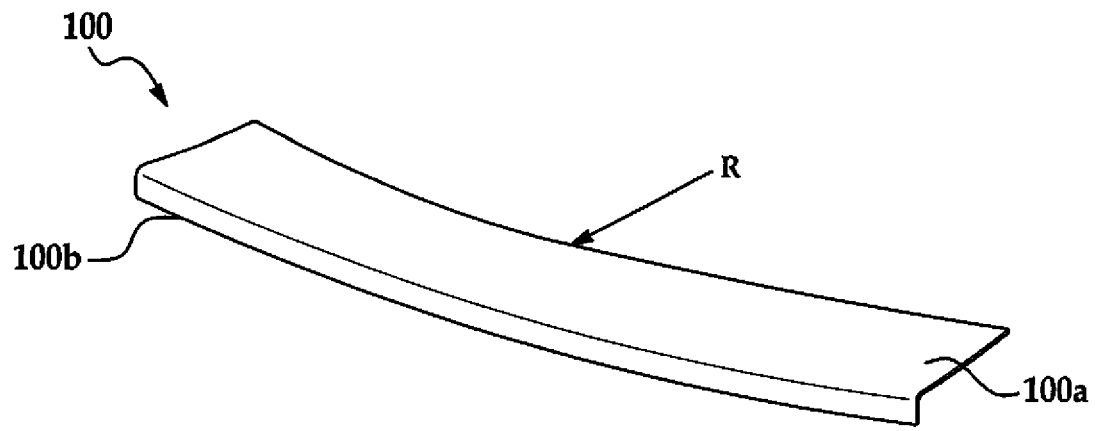
FIG. 19 is an illustration of a perspective view of a composite stiffener.
Figure 20:
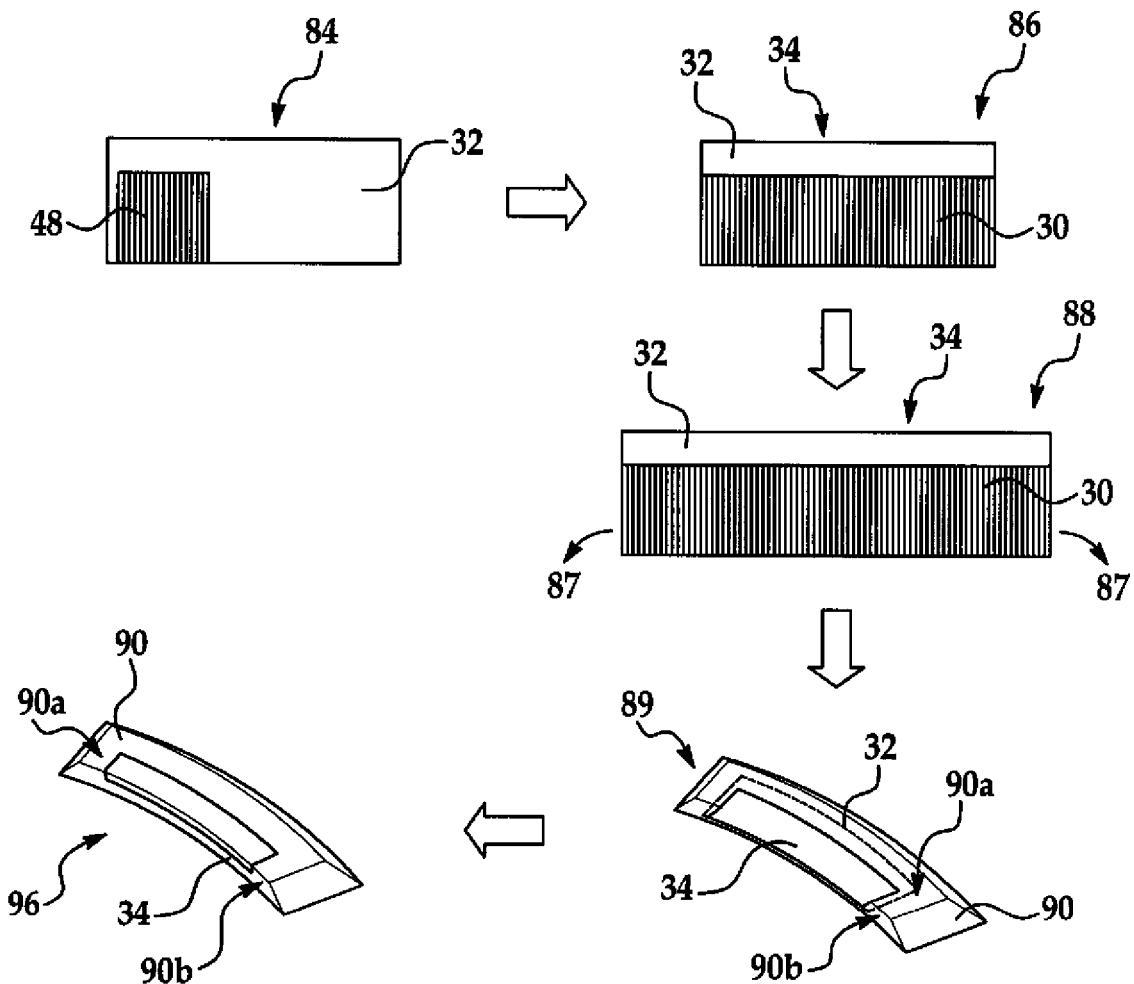
FIG. 20 is an illustration of diagrammatic views showing the steps of a method for laying up composite plies using the deformable carrier film to form the stiffener section shown in FIG. 19.

FIG. 20 diagrammatically illustrates the steps of the layup method shown in FIG. 18, in which a curved stiffener 100 shown in FIG. 19 having a L-shaped cross section and radius of curvature R is laid up on a curved tool 90. The tool 90 includes two contiguous, curved tool surfaces 90a, 90b for respectively forming a web 100a and a curved flange 100b of the stiffener 100 shown in FIG. 19. As shown at 84, courses 48 of unidirectional prepreg material are laid down side-by-side on a deformable carrier film 32 to form a completed 90 degree ply 30 shown at 86. The completed ply 30 is then compacted onto the film 32, following which at 88, the film 32 is then stretched and deformed radially as shown by the arrows 87 to generally match the curvature of the tool surface 90a. As shown at 89, the ply 30 is deformed into a fan shape and placed onto the tool surface 90a using the film 32 to form the curved web 100a of the stiffener 100. The carrier film 32 and a peel ply (not shown) may then be removed from the partially formed ply 30. With the carrier film 32 having been removed, the ply 30 is then formed down over the tool surface 90b to form the flange 100b of the stiffener 100. While the above example illustrates the use of the carrier film 32 to form plies along curves in a single plane, the carrier film 32 may also be used to form plies over tools (not shown) having compound curved surfaces, joggles, etc.

Figure 21:
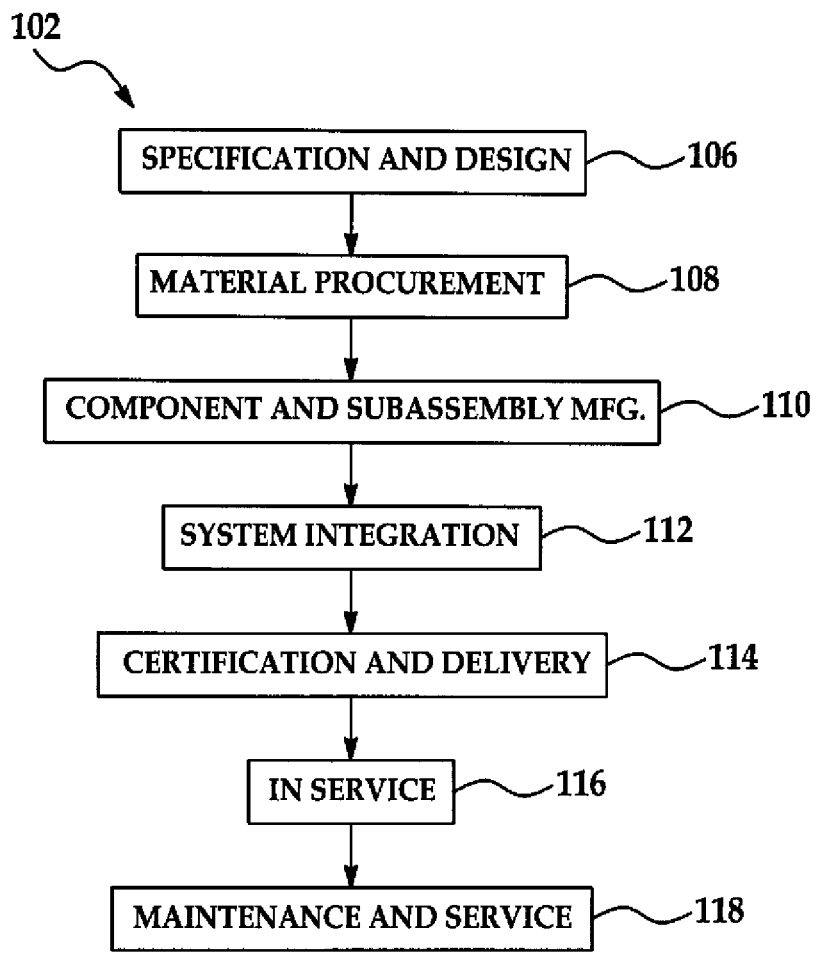
FIG. 21 is an illustration of a flow diagram of aircraft production and service methodology.
Figure 22:
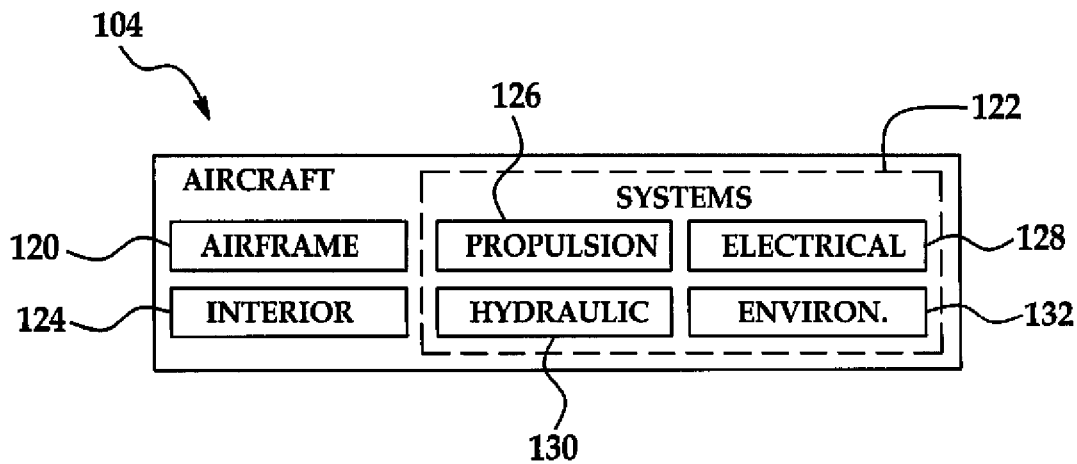
FIG. 22 is an illustration of a block diagram of an aircraft.

Referring next to FIGS. 21 and 22, embodiments of the disclosure may be used in the context of an aircraft manufacturing and service method 102 as shown in FIG. 21 and an aircraft 104 as shown in FIG. 22. During pre-production, exemplary method 102 may include specification and design 106 of the aircraft 104 and material procurement 108. During production, component and subassembly manufacturing 110 and system integration 112 of the aircraft 104 takes place. During step 110, the disclosed method and apparatus may be employed to fabricate composite parts such as fuselage frame sections and stiffeners which are then assembled at step 112. Thereafter, the aircraft 104 may go through certification and delivery 114 in order to be placed in service 116. While in service by a customer, the aircraft 104 may be scheduled for routine maintenance and service 118 (which may also include modification, reconfiguration, refurbishment, and so on).

Each of the processes of method 102 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 104 produced by exemplary method 102 may include an airframe 120 with a plurality of systems 122 and an interior 124. The disclosed method and apparatus may be employed to fabricate frame sections and stiffeners which form part of the airframe 120. Examples of high-level systems 122 include one or more of a propulsion system 126, an electrical system 128, a hydraulic system 130, and an environmental system 132. Any number of other systems may be included. Although an aerospace example is shown, the principles of the invention may be applied to other industries, such as the automotive industry.

The apparatus embodied herein may be employed during any one or more of the stages of the production and service method 102. For example, components or subassemblies corresponding to production process 110 may be fabricated or manufactured in a manner similar to components or subassemblies produced while the aircraft 104 is in service. Also, one or more apparatus embodiments may be utilized during the production stages 110 and 112, for example, by substantially expediting assembly of or reducing the cost of an aircraft 104. Similarly, one or more apparatus embodiments may be utilized while the aircraft 104 is in service, for example and without limitation, to maintenance and service 118.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method comprising:
   applying a composite prepreg over a deformable carrier;
   using the carrier to transport and locate the composite prepreg over a tool;
   deforming the composite prepreg by stretching the carrier, stretching comprising changing one of a length or a width of the carrier;
   using the carrier to apply the prepreg to the tool; and
   removing the carrier from the prepreg.

2. The method of claim 1, wherein:
   applying the prepreg over the carrier includes compacting the prepreg against the carrier; and
   the carrier is removed from the prepreg after the prepreg has been applied to the tool.

3. The method of claim 1, wherein applying the composite prepreg includes:
   applying courses of unidirectional prepreg tape in side-by-side relationship on the carrier.

4. The method of claim 1, further comprising:
   applying at least one of a release film and a ply doubler on the carrier before the composite prepreg is applied to the carrier.

5. The method of claim 1, further comprising:
   reinforcing a portion of the carrier against stretching in a first direction.

6. The method of claim 5, wherein reinforcing the portion of the carrier includes at least one of:
   increasing a thickness of the carrier in the portion of the carrier;
   embossing the carrier in the portion of the carrier; and
   incorporating reinforcing fibers into the portion of the carrier.

7. The method of claim 1, wherein stretching the carrier is performed as the prepreg is being applied to the tool.

8. A method of laying up a composite prepreg over a contoured tool, comprising:
   placing prepreg material on a carrier film; and
   using the carrier film to apply the prepreg material to the tool, including deforming the prepreg material by stretching the carrier film, stretching comprising changing one of a length or a width of the carrier film.

9. The method of claim 8, wherein placing the prepreg material on the carrier film includes:
   laying down courses of unidirectional prepreg fiber tape in side-by-side relationship on the carrier film; and
   compacting the courses against the carrier film.

10. The method of claim 8, wherein the steps of placing prepreg material on the carrier film and using the carrier film to apply the prepreg material to the tool are repeated to form a multiply part layup.

11. The method of claim 8, wherein deforming the prepreg material includes stretching the carrier film in a direction traverse to an orientation of fibers in the composite material.

12. A method of laying up a multi-ply composite part on a tool having contoured surfaces to which a layup is to conform, comprising:
    providing a deformable carrier film;
    reinforcing a portion of the carrier film against stretching, including impregnating the portion with reinforcing fibers;
    placing a composite doubler on a surface of the carrier film;
    placing a strip of release film on the surface of the carrier film;
    placing a composite ply on the surface of the carrier film overlying the doubler and the strip of release film by laying down a plurality of courses of unidirectional prepreg fiber tape in side-by-side relationship on the surface of the carrier film;
    compacting the composite ply, the doubler and the strip of release film against the carrier film;
    using the carrier film to transport the composite ply to a layup tool;
    using the carrier film to layup the doubler, the strip of release film and the composite ply on the layup tool, including deforming the composite ply by stretching the carrier film, stretching comprising changing one of a length or a width of the carrier film, the portion of the carrier film reinforced against stretching allows for controlled non-uniform deforming of the composite ply, wherein deforming of the composite ply allows the composite ply to conform to contoured areas of the layup tool; and
    peeling away the carrier film from the composite ply when the composite ply has been laid up and conformed to the layup tool.

13. The method of claim 1, wherein deforming the composite prepreg by stretching the carrier comprises increasing a spacing between unidirectional prepreg fibers by stretching the carrier in a first direction transverse to a second direction of the fibers.

14. The method of claim 1, wherein the carrier comprises an elastic material that returns substantially to its original size and shape following stretching.

15. The method of claim 1, wherein the composite prepreg is placed on the carrier so as to leave one or more edge margins on the carrier around the composite prepreg; wherein the one or more edge margins facilitate at least one of handling of the carrier and attachment of hardware or equipment to the carrier.

16. The method of claim 15, wherein the hardware or equipment may be used to deform, manipulate and/or hold the carrier during layup.

17. The method of claim 5, wherein the portion of the carrier reinforced against stretching allows for controlled non-uniform deforming of the prepreg material.

18. The method of claim 3, wherein stretching the carrier controls a size of an overlap or a gap between the courses while applying the prepreg to the tool.

19. The method of claim 1, wherein deforming the composite prepreg by stretching the carrier includes stretching the carrier such that a width of the composite prepreg remains substantially the same, while a length of the composite prepreg is deformed to a greater length as a result of the stretching of the carrier.

20. The method of claim 1 further comprising:
    cutting at least one end of the composite prepreg at a pre-selected angle to compensate for a shearing effect in the composite prepreg during deformation.

21. The method of claim 1, wherein stretching the carrier along an Y axis results in a change in an orientation angle of fibers of the composite prepreg.

22. The method of claim 5, wherein a corresponding portion of the composite prepreg overlying the portion of the carrier reinforced against stretching is not deformed during the stretching of the carrier.

23. The method of claim 1, wherein the carrier is configured to prevent wrinkling of the prepreg during deformation of the prepreg.

24. The method of claim 1, wherein deforming the prepreg includes deforming the prepreg radially.

* * * * *